United States Patent Office 2,786,713
Patented Mar. 26, 1957

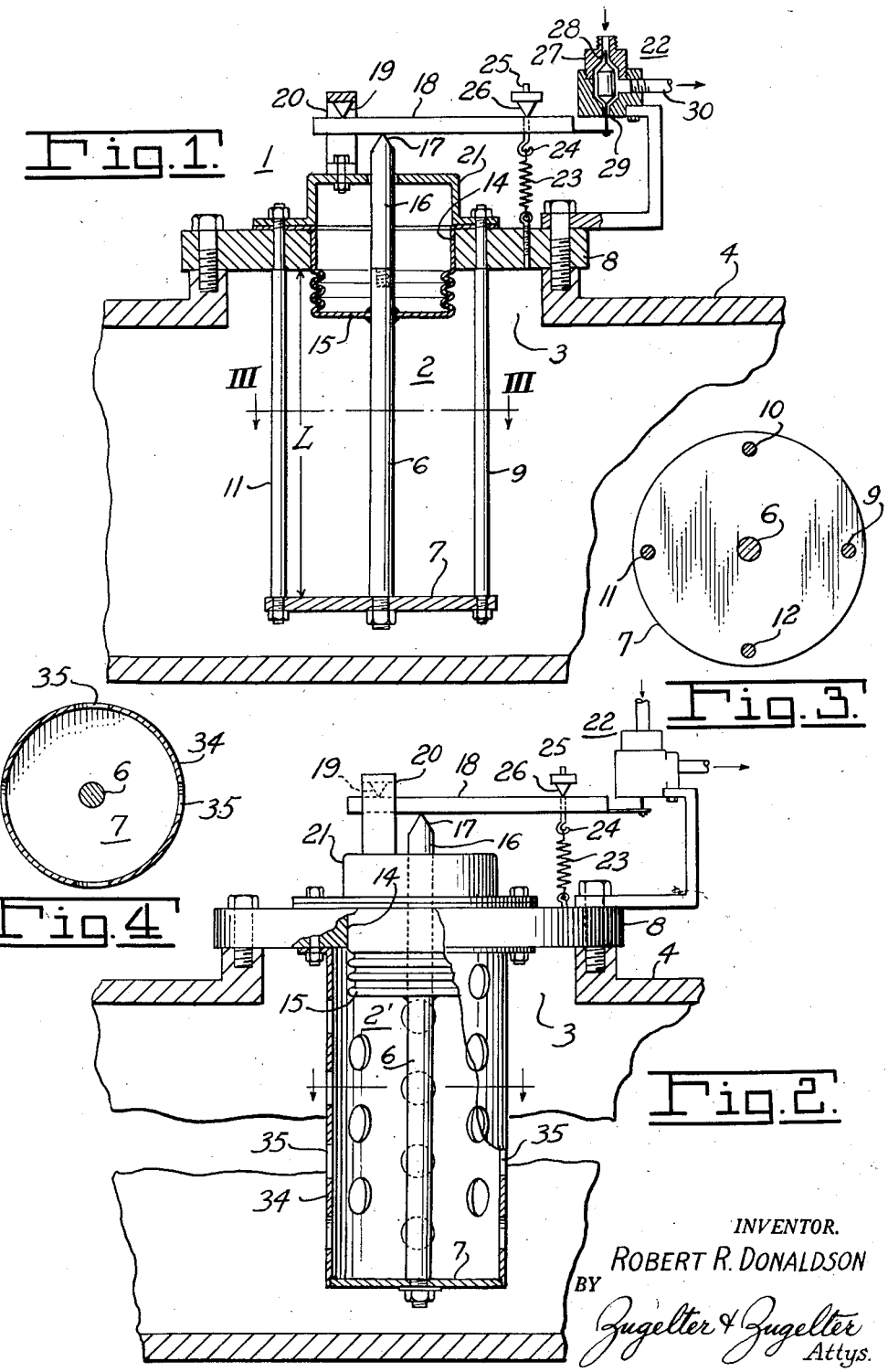

2,786,713

THERMOSTAT FOR HOT GASES

Robert R. Donaldson, Forest Hills, Pa., assignor to Hagan Corporation, Pittsburgh, Pa., a corporation of Pennsylvania Application August 31, 1953, Serial No. 377,590

1 Claim. (Cl. 297—11)

This invention relates to thermostats.

An object of this invention is to provide a thermostat in which the thermo-expansive unit is so constructed that hot gases and other hot media may freely contact the thermo-expansive member, thereby rendering the thermostat sensitive and quickly responsive to changes in temperature.

Another object of the invention is to provide a thermostat which has a base or closure member for an aperture in the wall of a vessel or pipe through which hot gases flow, to which closure member is secured the thermo-responsive means comprising a centrally-disposed, temperature-responsive, rod-like member, and a cage or open frame disposed about the temperature-responsive member, which is relatively non-thermo-responsive, so that hot gases or other media may freely contact the thermo-responsive member.

Other objects of the invention will be apparent to those of ordinary skill in the art to which the invention pertains, from the following description taken in conjunction with the accompanying drawing.

In the drawing:

Figure 1 is a view, in section, of a thermostat, arranged and constructed in accordance with an embodiment of the invention, the thermostat being shown mounted on a pipe or wall of casing, with the temperature-responsive means extending into the same;

Fig. 2 is a view, in section, similar to Fig. 1, of a modified form of thermostat;

Fig. 3 is a view in section, taken on line III—III of Fig. 1; and

Fig. 4 is a view, in section, taken on line IV—IV of Fig. 2.

In Fig. 1 of the drawings a thermostat 1 is illustrated, that comprises a temperature-responsive means 2 extending through an aperture 3 in the wall of a pipe or casing 4, through which hot gases or other media flow. The temperature-responsive means 2 may be in the form of a rod 6, the inner end of which is secured to a support member 7. The rod 6 and the support member 7 are secured to a closure member 8, by means of a plurality of rods 9, 10, 11 and 12 (see Fig. 3). The inner ends of the rods 9 to 12 are secured to member 7, and their outer ends are secured to the closure member 8. Rods 9 to 12, inclusive, have a relatively low, preferably zero, temperature co-efficient of expansion, so that the expansion or contraction of rod 6 will result in movement at its outer end that is proportional to changes in the temperature of the gases.

Closure member 8, as shown, covers the opening 3 into the vessel or pipe 4, and is bolted or otherwise secured thereto. In order to provide a seal at the point where rod 6 extends through an aperture 14 in closure member 8, a sealing element or member 15 is provided. As illustrated, member 15 is in the form of a bellows which is open at its outer end and closed at its inner. Rod 6 extends through the closed end of member 15, but is welded or otherwise secured thereto to provide a gas-tight joint. The walls of the bellows, as illustrated, are secured in gas-tight relationship to the walls of an aperture 14 by soldering, brazing, or welding.

Rod 6, as shown, is so designed that its length L is equal to the length of the respective rods 9 to 12. The rod 6 may be extended from the outermost point of length L, by a push rod element 16, which has, preferably, a zero co-efficient of expansion. The outer end of the element 16 may be utilized to operate an indicating or control mechanism.

As illustrated, the outer end of element 16 may be provided with a knife edge 17, that engages the under side of a beam 18, forming a part of the control mechanism. Adjacent knife edge 17 and to the left thereof, as seen in Fig. 1, is a knife edge 19 that bears on the top of beam 18. Knife edge 19 is mounted on a bracket 20, which is secured to a guide bracket 21 which, in turn, is fastened to the closure member 8. The guide bracket 21 is provided with a guide opening through which the element 16 extends. Beam 18 may be urged in a clockwise direction about knife edge 17, by means of a spring 23, which is anchored at its lower end to member 8, and to a hook 24 of a stem 25, that is coupled to a knife edge 26 acting on the top of beam 18. Beam 18 may be utilized to actuate a control element of any desired form. The particular control element illustrated is an escapement valve 22. The escapement valve 22, as illustrated, comprises a body 27 having an inlet port 28, an exhaust port 29, and an outlet port 30. A control medium, such as compressed air, may be transmitted from the inlet port 28 through port 30 to a device to be regulated in accordance with the temperature in the pipe or housing 4. Within the valve body 27 is a movable valve element 31, having cone points at each end for controlling the inlet and exhaust ports 28 and 29. As the element 31 moves upwardly towards the seat 28, the inlet port is throttled while the exhaust port is opened, thereby allowing the pressure medium to escape to the atmosphere until the pressure at the outlet 30 is in balance with the pressure drops across the respective inlet and outlet ports. When the inlet port is closed completely, the pressure at the outlet 30 will be atmospheric. If the valve element 31 is seated on the exhaust port 29, the pressure at the outlet 30 will rise to the value of the pressure at the inlet port. For intermediate positions of the valve 31, the pressure at port 30 will have a value corresponding to the particular position.

As the temperature of the gases in the pipe or housing 4 increase, the thermo-expansive member 6 increases in length, thereby turning the beam 18 counter-clockwise about its knife edge 19, and actuating valve 31 towards the inlet port 28. As the temperatures decrease, the length of rod 6 decreases, whereby beam 18 tends to turn clockwise, causing the valve 31 to move towards the exhaust port 29, to increase the pressure at the outlet port 30.

By the arrangement of the thermostatic elements shown in Fig. 1, the hot gases will have free access to the thermo-expansive element 6. Therefore, the thermostatic device will be quick to respond to temperature changes.

In Fig. 2 is illustrated a modified form of temperature-responsive means 2'. In the form illustrated in Fig. 2, the temperature-responsive element 6 is the same as in Fig. 1. It is sealed at the aperture in base 8 in the same manner, by means of a bellows 15, and the outer end of the rod may be connected by a substantially zero co-efficient element 16 for actuating some device to be controlled or actuated as, for example, the beam 18. In lieu of the rods 9 to 12, the temperature-responsive element 6 may be encased by a tubular member 34, having substantially a zero, or relatively low, co-efficient of expansion. The lower end of the tubular member 34 is secured to base member 7, and the upper end thereof may be flanged and secured to the under side of closure member 8, as shown. In order that the gases in pipe 4 may have free contact with the temperature-responsive rod 6, the tubular member 34 may be provided with a plurality of appropriately spaced openings 35, whereby the entire inner space of member 34 may be filled with the gases, to which element 6 is to respond.

Having thus described the invention, it will be apparent to those skilled in the art to which this invention pertains, that the illustrated embodiments may be modified and changed without departing from either the spirit or the scope of the invention.

Therefore, what is claimed as new and desired to be secured by Letters Patent is:

A thermostat adapted to be inserted into an aperture in a casing, and respond to hot gases therein and actuate a control element, said thermostat comprising a control element, a closure member for said aperture having an opening therein, a thermo-responsive means comprising a thermo-expansive member disposed co-axially with said opening in said closure member, the outer end of which projects through said opening, a flanged guide member carried by said closure through which the thermo-expansive member projects, a flexible sealing means comprising a flanged bellows having a closed end and an open end, the closed end being connected and sealed to said thermo-expansive member adjacent its outer end and the open end being connected to said closure member to seal and close the opening therein, and a relatively non-temperature-responsive means disposed about said thermo-expansive member, providing for the flow of hot gases in contact with said thermo-expensive member, said relatively non-thermo-expansive means comprising threaded rods projecting through said closure and through the flanges on the bellows and guide member to clamp the same to the closure and means connecting the inner ends of said thermo-expansive member to the inner end of said relatively non-thermo-expansive means, said thermo-expansive member being provided at its outer end with means adapted to actuate said control element.

References Cited in the file of this patent
UNITED STATES PATENTS

| | | |
|---|---|---|
| 862,753 | Pilcher | Aug. 6, 1907 |
| 1,637,756 | Stickney | Aug. 2, 1927 |
| 2,477,757 | Leslie | Aug. 2, 1949 |
| 2,500,414 | Hottenroth | Mar. 14, 1950 |